Jan. 9, 1962 S. L. PECK ET AL 3,016,140

CARD PROCESSING APPARATUS

Filed Jan. 30, 1956 3 Sheets-Sheet 1

STUART L. PECK
LOREN R. WILSON
INVENTORS

BY Smyth & Roston

ATTORNEYS

Jan. 9, 1962 S. L. PECK ET AL 3,016,140

CARD PROCESSING APPARATUS

Filed Jan. 30, 1956 3 Sheets-Sheet 2

STUART L. PECK
LOREN R. WILSON
INVENTORS

BY Smyth & Roston

ATTORNEYS

CARD PROCESSING APPARATUS
Filed Jan. 30, 1956 3 Sheets-Sheet 3
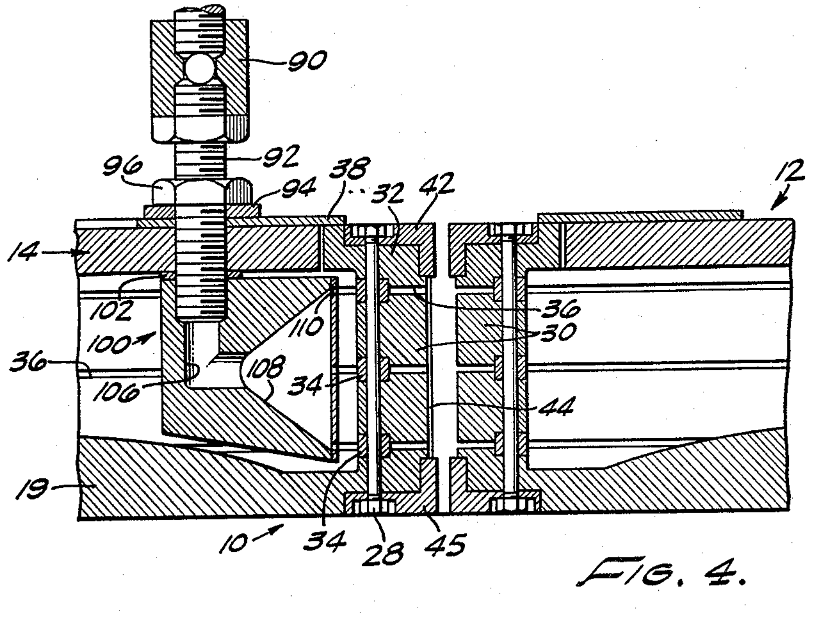
FIG. 4.
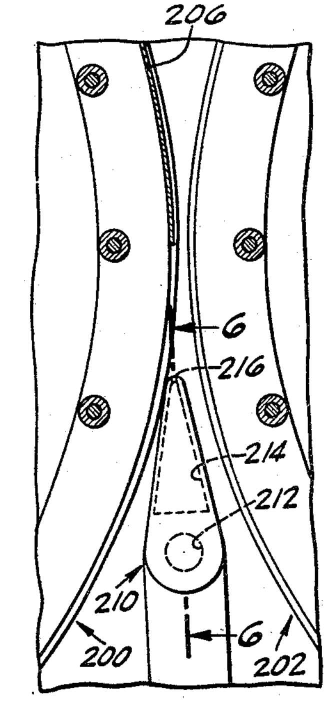
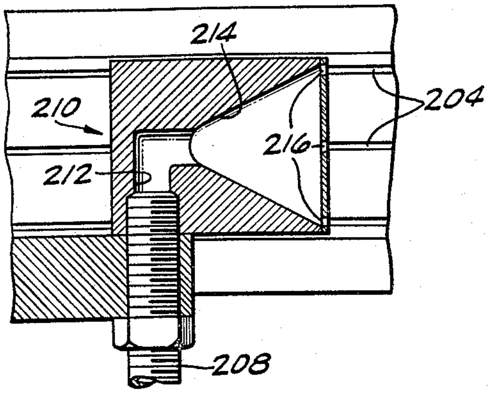
FIG. 6.
FIG. 5.
STUART L. PECK
LOREN R. WILSON
INVENTORS
BY Smyth & Roston
ATTORNEYS United States Patent Office 3,016,140

Patented Jan. 9, 1962

3,016,140

CARD PROCESSING APPARATUS

Stuart L. Peck, Santa Monica, and Loren R. Wilson, Pacific Palisades, Calif., assignors to The Magnavox Company, Los Angeles, Calif., a corporation of Delaware Filed Jan. 30, 1956, Ser. No. 562,154
29 Claims. (Cl. 209—72)

This invention relates to apparatus for processing information cards during the circulation of the cards on rotatable drums. More particularly, the invention relates to apparatus for obtaining a transfer of cards from a first drum to a second drum at particular times to facilitate the processing of the information on the cards.

In recent years, digital computers and data processing systems have been built for a wide variety of uses. For example, data processing systems have been built to control the operation of such commercial establishments as large department stores. The data processing systems are used to control such functions in the department stores as the pricing and reordering of merchandise. Data processing systems have also been used in banks to maintain customers' accounts on a current basis.

Quite often the data processing systems have to deal with a large number of different bits of information. For example, in complex data processing systems, as many as hundreds of thousands and even millions of bits of information may sometimes be involved. Because of the large number of different information bits which may have to be processed, problems have been presented in the presentation of the different information bits for computation.

One type of data processing system employs cards for storing the different bits of information. Each card may contain a plurality of bits of information represented by holes or the absence of holes, or by magnetic spots of first or second polarization. The cards circulate on a plurality of drums such that the information on the cards becomes processed as the cards move on the drums. In order to process the cards properly, the cards have to be transferred from one drum to the next. Until now, the cards have been transferred by movable members such as fingers movable into contiguous relationship with the drums. This may sometimes be disadvantageous because of the inertia involved in making components move.

This invention provides apparatus for obtaining a transfer of information cards from a first drum to a second drum without any need for moving parts. The invention uses drums which are formed so that a vacuum can be produced on the periphery of the drums to maintain the cards in fixed position on the drum peripheries as the drums rotate. Means are included to direct a stream of air against the cards which are moving on the periphery of the drum, so as to overcome the vacuum effect and obtain the transfer of the cards from the first drum to the second drum. In one embodiment, the stream of air is directed radially outwardly against the periphery of the first drum to obtain the transfer of cards from the first drum to the second drum. In another embodiment, the stream of air is directed in a substantially tangential direction against a first drum to obtain the transfer of cards from the first drum to a second drum.

In the drawings:

FIGURE 4 is an enlarged fragmentary sectional view substantially on the line 4—4 of FIGURE 3 and illustrates in further detail the contiguous portions of the first and second drums and the apparatus for obtaining a transfer of cards from the first drum to the second drum;

Figure 3:
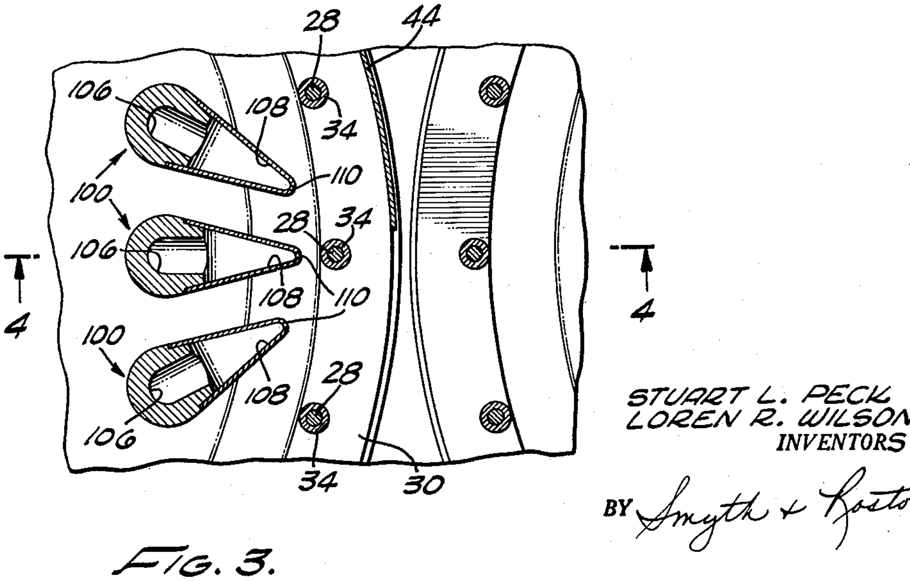
FIGURE 3 is an enlarged fragmentary sectional view substantially on the line 3—3 of FIGURE 2 and shows in some detail the contiguous portions of the first and second drums and the apparatus for obtaining the transfer of information cards from the first drum to the second drum.

FIGURE 5 is an enlarged fragmentary sectional view similar to that shown in FIGURE 3 and shows contiguous portions of first and second drums and a second embodiment of apparatus for obtaining a transfer of information cards from the first drum to the second drum; and FIGURE 6 is an enlarged fragmentary sectional view substantially on the line 6—6 of FIGURE 5 and illustrates in further detail the first drum and the embodiment of the apparatus shown in FIGURE 5 for obtaining the transfer of cards from the first drum to the second drum.

In the embodiment of the invention shown in FIGURES 1 to 4, inclusive, transport members such as a pair of rotatable drums generally indicated at 10 and 12 are provided. Actually the drum 12 may be considered as a member for receiving cards from the drum 10. The construction of the drum 10 is shown in detail in FIGURE 2. The construction of the drum 12 is not shown in detail, but it should be appreciated that the drum may be constructed in a manner similar to the construction of the drum 10. The drum 10 includes an annular top plate 14 (FIGURE 2) suitably attached as by brackets 15 and screws 16 to a table 17. The upper face of the plate 14 is flat. The lower face of the plate 14 extends downwardly as it extends radially inwardly so as to approach a conical configuration. This is illustrated at 18 in FIGURE 2. The lower surface of the plate 14 is preferably slightly concave for reasons which will be described in detail subsequently.

Certain members in the drum 10 are adapted to rotate relative to the plate 14. These members include an annular bottom plate 19 suitably attached as by screws 20 to a collar portion 22 on a hollow shaft 24. The lower face of the plate 19 is flat. The upper face of the plate 19 extends upwardly as it extends radially inwardly so as to approach a conical configuration. This is illustrated at 26 in FIGURE 2. The upper surface of the plate 19 is preferably slightly convex for reasons which will be described in detail subsequently. The upper surface of the plate 19 and the lower surface of the plate 14 gradually approach each other as they progress radially inwardly. The space between the top plate 14 and the bottom plate 19 may be considered as passageway 27.

Studs 28 extend upwardly through the plate 19 at spaced positions along the periphery of the plate. The studs 28 extend through a pair of rings 30 and through an annular cover plate 32 to maintain the plates 19 and 32 and the rings 30 in fixed positioning relative to one another. Sockets are provided at the inner edges of the rings 30 in the upper and lower faces of the discs and are also provided at the inner edges of the plates 19 and 32 in the upper face of the plate 19 and the lower face of the plate 32. Spacers 34 are disposed in the sockets in the plates 19 and 32 and in the rings 30 to form slots 36 between the rings and between the rings and the plates.

The cover plate 32 extends to a position contiguous to the plate 14 such that the upper surface of the plate 32 is substantially flush with the upper surface of the plate 14. An annular strip 38 is disposed on the plates 14 and 32 at the position between the plates and is attached as by screws 40 to the plate 14 to seal the slot formed between the plates.

At a peripheral position at its upper end, the cover plate 32 has a shoulder portion for receiving an annular cap member 42. The cap member 42 is provided with sockets for receiving nuts which are screwed on threaded portions at the upper ends of the studs 28 so as to fixedly position the cap member with respect to the cover plate 32. The cap member 42 has a lip portion which extends downwardly to a position overhanging the cover plate 32 and the rings 30 by a horizontal distance corresponding substantially to the thickness of information cards 44. A cap member 45 is associated with the plate 19 in a manner similar to the association between the plate 32 and the cap member 44.

Bearings 46 are provided at opposite ends of the shaft 24. The inner races of the bearings 46 are mounted on the shaft 24 and the outer races of the bearings are disposed against bushings 48 secured to a housing 50 as by studs 52. The housing 50 extends through a hole 53 in the table 17. Seals 54 are disposed at opposite ends of the bearings to prevent the leakage of lubricating fluid from the bearings. A hole 56 is provided in the housing 50 at a position between the bearings 46. The hole 56 is provided so that a belt 58 can extend through the housing and around a pulley 60. The pulley 60 is suitably positioned within the housing 50 as by sleeves 62 mounted on the shaft 24 between the bearings 46. In this way, the shaft 24 can be rotated by a suitable motor (not shown).

The bearings 46 and the sleeve 62 are maintained in fixed position on the shaft 24 as by a lock washer 64 and a nut 66. The nut 66 is adapted to be screwed on a threaded portion at the bottom of the shaft 24. A sealing disc 68 is also adapted to be screwed on the threaded portion of the shaft 24. The sealing disc 68 operates in conjunction with a plate 70 to prevent movement of air between the interior of the housing 50 and the interior of the hollow shaft 24 upon a difference in pressure between the housing and the shaft.

The plate 70 is secured to the housing 50 as by studs 72. A hollow conduit 74 is in turn disposed as by a push fit within the plate 70. In this way, air can be exhausted from the hollow interiors of the shaft 24 and the conduit 74 as by a vacuum pump 76. Although the pump 76 is shown in block form in FIGURE 2, it should be appreciated that any suitable type of pump can be used.

Apparatus is included in FIGURES 1 to 4, inclusive, to obtain a transfer of the information cards 44 from the drum 10 to the drum 12. This apparatus includes a supply line 80 (best seen in FIGURE 2) adapted to receive a flow of fluid such as air under pressure from a source 82. Although the pressure source 82 is indicated in block form for purposes of simplification, it should be appreciated that various types of pressure sources can be used. The supply line 80 is adapted to be coupled to a supply line 84 under the control of a valve 86. The operation of the valve 86 is in turn controlled by a solenoid 88. The construction of the valve 86 and the solenoid 88 is shown somewhat schematically in FIGURE 2 since it is believed that the construction of these members should be understood by a person skilled in the art.

The supply line 84 in turn communicates with a conduit 90 (FIGURE 1) disposed in a substantially horizontal plane at a position above the drum 10 and near the position of contiguity between the drums 10 and 12. A plurality of feed lines 92 (FIGURE 4) extend downwardly from the conduit 90 at spaced intervals along the conduit. The feed lines 92 have threaded portions for screwing into tapped holes in the top plate 14. Gaskets 94 may be disposed on the feed lines 92 and positioned against the sealing strip 38. Lock nuts 96 screw on the threaded portions of the feed lines 92 to press against the gaskets 94 for maintaining the feed lines in fixed positioning with respect to the top plate 14.

Housings generally indicated at 100 are disposed within the drum 10 between the top plate 14 and the bottom plate 19 at positions near the periphery of the drum. The housings 100 are provided at their upper ends with tapped holes so that the housings can be screwed on the threaded portions of the feed lines 92. Gaskets 102 (FIGURE 4) may be carried on the feed lines 92 at positions between the tops of the housings 100 and the lower face of the top plate 14 to separate the housing and the plate.

The housings 100 are provided with tear-drop configurations in horizontal cross-section, as best seen in FIGURE 3. Because of these tear-drop configurations, the housings are symmetrical about a middle line and taper towards this line of symmetry with progressive movements toward the periphery of the drum 10. The housings 100 are disposed so that their lines of symmetry intersect at a position near the position at which the drum 10 is contiguous to the drum 12.

Passageways 106 (FIGURES 3 and 4) are provided in the housings 100 in communication with the feed lines 92. The passageways 106 have first portions which extend downwardly from the feed lines 92 and second portions which extend horizontally toward the periphery of the drum 10. The horizontal portions of the passageways 106 in turn communicate with mouth portions 108 in the housing.

The mouth portions 108 in the housings 100 occupy almost the entire dimensions of the housings in a lateral direction. The mouth portions 108 have a flared configuration in the vertical direction with progressive movements toward the periphery of the drum 10 so as to have progressively increasing dimensions in this direction. The mouth portions 108 communicate with holes 110 provided in the housing at the end of the housing closest to the periphery of the drum 10. The holes 110 are disposed in the vertical direction at spaced positions corresponding to the vertical levels of the slots 36 in the drum 10. This may be best seen in FIGURE 4.

As described above, the cards 44 are adapted to circulate on the drum 10 for transfer to the drum 12. Each card 44 is provided with a plurality of bits of information. Each bit of information by itself or in combination with other bits represents informaton in digital form. This information may relate to numbers, alphabetical letters, combinations of numbers and letters (alphanumeric coding), or any other pertinent matter. The bits of information may be disposed in rows, each of which may extend in a direction substantially parallel to the top of the table 17.

The bits of information may be provided in any suitable form on the cards 40. For example, the information may be represented by holes or the absence of holes at the different positions in each card 44. Preferably, the information is represented in magnetic form. In this form, magnetic fluxes of one polarity at a position on the cards 44 may represent an indication of "0" or a "false state," and magnetic fluxes of an opposite polarity at a position may represent an indication of "1" or a "true" state.

Figure 1:
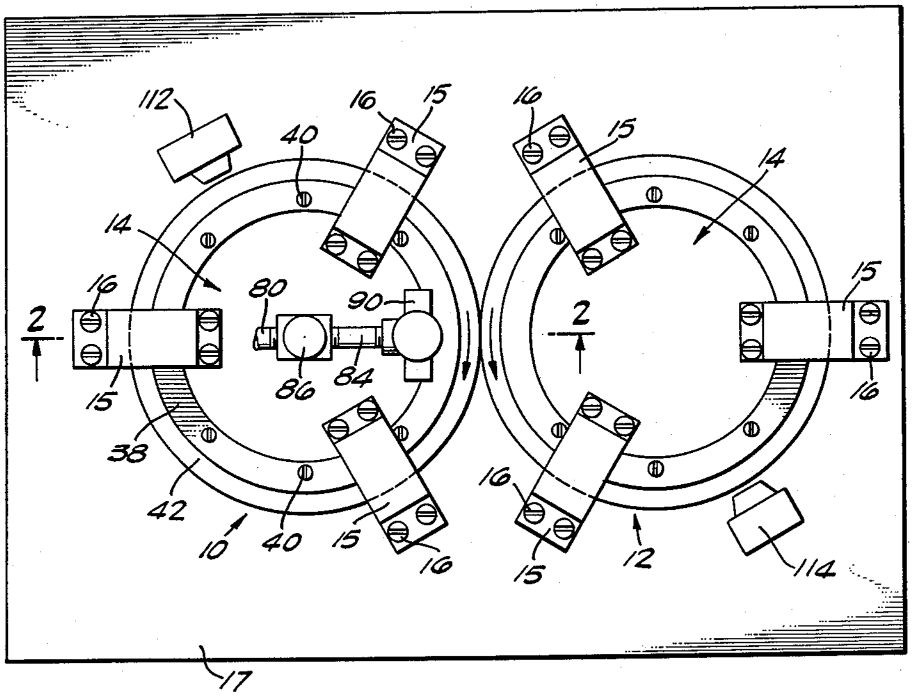
FIGURE 1 is a top plan view of a pair of contiguous drums and of one embodiment of apparatus for obtaining a transfer of cards from a first drum in the pair to the second drum.

As shown in FIGURE 1, a transducing member 112 is disposed in contiguous relationship to the drum 10 to read the bits of information on the drum. Only the transducing member 112 is indicated in FIGURE 1, but it should be appreciated that any other number of transducing members can be positioned in contiguous relationship to the periphery of the drum 10 in accordance with the number of different rows of information on the cards 44. In like manner, a transducing member 114 is shown as being in contiguous relationship to the drum 12. It will be appreciated that a plurality of transducing members can be disposed in contiguous relationship to the drum 12 in accordance with the different rows of information on the cards 44.

When the bits of information on the cards 44 are in magnetic form, each of the transducing members such as the members 112 and 114 is provided with magnetic means such as a coil. The coil in each transducing member is so disposed as to be magnetically coupled to the cards 44 during the movement of the cards on the drums past the transducing members. The transducing members 112 and 114 may be connected to "read" the magnetic information on the different cards and to convert these magnetic indications into a corresponding pattern of electrical signals. The transducing members 112 and 114 may also be connected to record magnetic information on the cards 44 by converting electrical signals into a corresponding pattern of magnetic signals on the cards.

The cards 44 (FIGURE 3) become transferred to the drum 10 from an input stack (not shown). The construction of the input stack and the mode of transfer from the input stack to the drum 10 have been described in detail in previous applications such as application Serial No. 550,296 filed December 1, 1955, by Alfred M. Nelson et al. The cards 44 may also be transferred from another drum (not shown) to the drum 10 and may even be transferred from the drum 12 to the drum 10 by apparatus associated with the drum 12 and corresponding to the actuating apparatus shown in FIGURES 1 to 4, inclusive. The cards become positioned on the drum 10 in the space between the cap members 42 and 45.

When the cards 44 become transferred to the drum 10, they remain fixedly positioned on the drum as the drum rotates. The cards 44 remain fixedly positioned on the drum 10 because of the application of a vacuum pressure on the drum through the slots 36. The vacuum pressure is produced by the withdrawal of air through a circuit including the slots 36, the passageway 27 (FIGURE 2), the hollow interior of the shaft 24, the conduit 74 and the vacuum pump 76. The vacuum is produced with a minimum of turbulent flow of air through the passageway 27 since the passageway is defined by smooth and curved surfaces in the plates 14 and 19. These surfaces are shaped to produce a smooth flow of air in a manner similar to the movement of air past the wings of an airplane.

The vacuum pressure is produced on the periphery of the drum 10 in spite of the gap between the top plate 14 and the cover plate 32. This results from the action of the sealing strip 38 in minimizing the leakage of air through the gap between the plates 14 and 32. In like manner, very little leakage can occur between the shaft 24 and the housing 50 through the gap between the shaft and the conduit 74. This results from the sealing action provided by the disc 68 and the bottom plate 70.

Upon the transfer of one of the cards 44 to the drum 10, the cards move with the drum to the position at which the drum 10 is contiguous to the drum 12. When the actuating apparatus forming a part of this invention and shown in FIGURES 1 to 4, inclusive has not been operated, the card 44 moves on the drum 10 past the position of contiguity between the drums 10 and 12. In this way, the card 44 is able to remain on the drum 10 through one or more complete revolutions of the drum 10.

The card 44 is able to remain on the drum 10 through one or more complete revolutions of the drum 10 when the solenoid 88 (FIGURE 2) is not energized. Since the solenoid 88 is not energized, the armature associated with the solenoid remains in position to close the valve 86. Because of the closure of the valve 86, air cannot flow under pressure past the valve to the housings 100 and through the holes 110 to the periphery of the drum 10. Thus, the vacuum pressure exerted by the pump 76 on the periphery of the drum 10 remains predominant so that the card 44 remains fixedly positioned on the periphery of the drum.

When the solenoid 88 becomes energized, it actuates its associated armature into position for opening the valve 86. Upon the opening of the valve 86, air from the source 82 is able to flow under pressure through a circuit including the supply line 80 (FIGURE 2), the valve 86, the supply line 84, the conduit 90 (best seen in FIGURE 1), the feed lines 92 (best seen in FIGURE 4), the passageways 106 in the housings 100, the mouth portions 108 and the holes 110 in the housings 100. The air flowing through the holes 110 in the housings 100 have a great velocity because of the small areas of the holes. This causes the air to pass through the holes 110 as a jet stream and to strike the card 44 with a relatively great force.

As has been described previously, the housings 100 are disposed to direct the streams of air passing through the holes 110 so that the streams of air converge at a position at or near the position at which the drums 10 and 12 are contiguous. Because of this focusing action and because of the relatively great velocity with which the air passes through the holes 110, a considerable force is exerted on the card 44 by the streams of air. This force is sufficiently great to overcome the vacuum force exerted on the card 44 in a direction to maintain the card in fixed position on the periphery of the drum 10. The force exerted against the card 44 by the flow of air from the source 82 causes the card to leave the periphery of the drum.

The card 44 becomes withdrawn from the periphery of the drum 10 at approximately the position at which the card is closest to the drum 12. When the card 44 becomes withdrawn from the drum 10, it starts to travel in a direction somewhat tangential to the periphery of the drum 10 at the position of withdrawal. As may be best seen in FIGURE 3, this tangential movement of the card 44 is somewhat toward the periphery of the drum 12. As the card 44 leaves the periphery of the drum 10, the vacuum force exerted on the periphery of the drum 12 also acts to attract the card to the periphery of the drum 12. Because of these actions, the card becomes positioned on the periphery of the drum 12. The card 44 remains fixedly positioned on the periphery of the drum 12 because of the action of the vacuum pressure in pressing the card against the drum.

Figure 2:
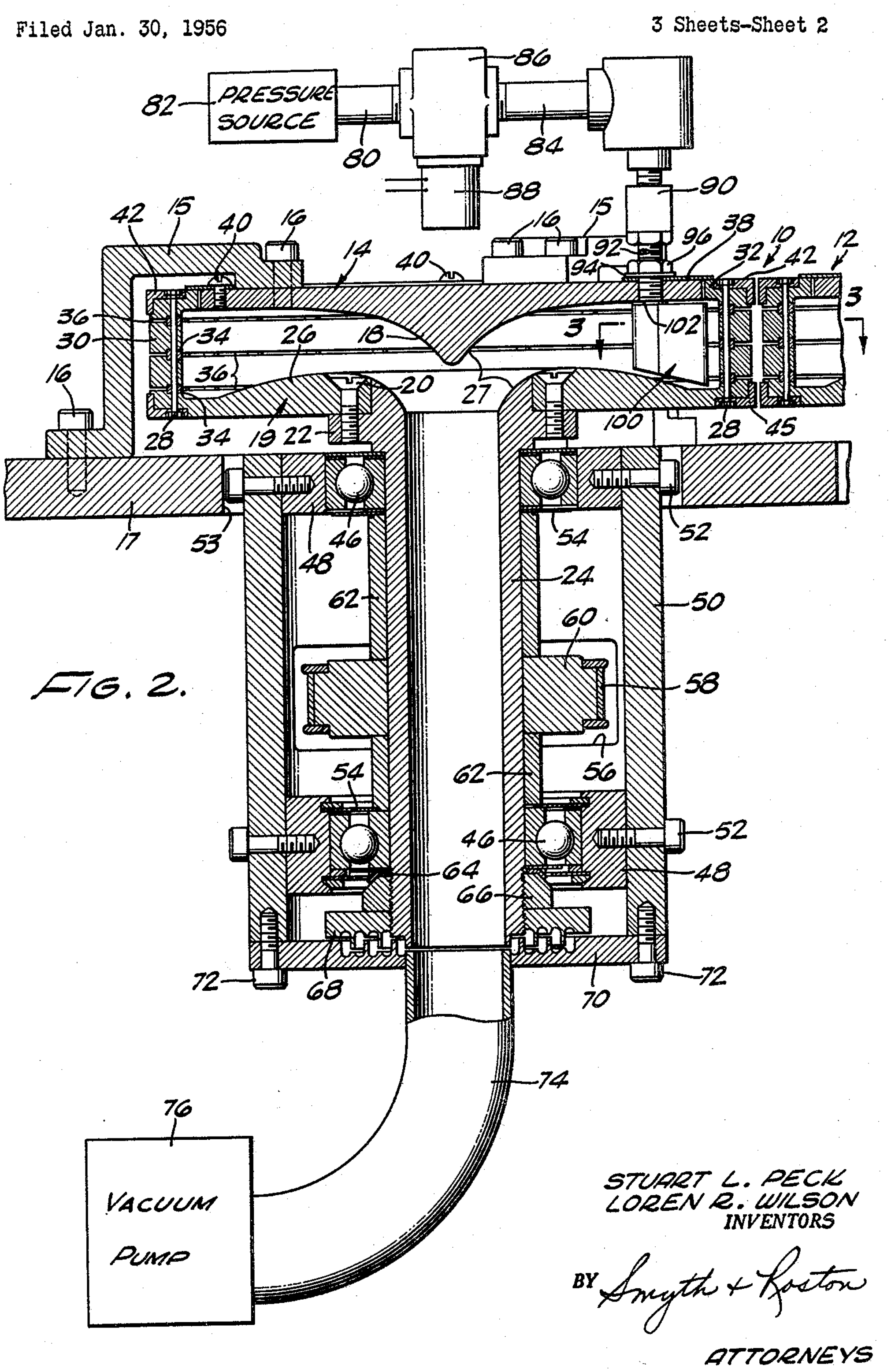
FIGURE 2 is an enlarged sectional view substantially on the line 2—2 of FIGURE 1 and illustrates the construction of the first drum in considerable detail and further illustrates in some detail the apparatus associated with the drum for obtaining the transfer of cards from the first drum to the second drum.

The force exerted against the cards 44 to transfer the cards to the drum 12 may be exerted on a continuous basis or on an intermittent basis. The imposition of the transferring force on a continuous basis or on an intermittent basis is dependent upon the function being performed by the drums 10 and 12. When the force is imposed on an intermittent basis, the force may be produced in accordance with the signal information on the cards 44 moving on the periphery of the drum 10 as the drum rotates. The signal information on the cards 44 may be read by the transducing member 112 (FIGURE 1) and may be processed to produce at particular times a control signal for introduction to the solenoid 88 (FIGURE 2). This control signal may be used to energize the solenoid 88 so that streams of air can be directed against the cards 44 to transfer the cards to the drum 12.

As will be seen in FIGURE 3, it may sometimes happen that one of the studs 28 and one of the spacers 34 may receive the air stream passing through the holes 110 in a particular one of the housings 100. This prevents the air stream passing through the particular housing 100 from reaching the card 44 on the periphery of the drum 10. For example, the air stream flowing through the holes 110 in the middle one of the housings 100 in FIGURE 3 may not be able to reach the card 44 on the drum 10. However, the air streams passing through the holes 110 in the other housings 100 are able to reach the card 44 on the drum 10 because of the inclination of the housings relative to one another. By creating streams of air with sufficient intensity, the cards 44 can be transferred from the drum 10 to the drum 12 even when the action of one of the housings becomes blocked. This is especially true when the studs 28 and the spacers 34 are provided with relatively small diameters.

In like manner, the cards 44 transferred to the drum 12 from the drum 10 may become subsequently transferred to a third drum by actuating apparatus similar to that shown in FIGURES 1 to 4, inclusive, and described above in detail. It is also possible that the cards 44 may be sometimes transferred from the drum 12 back to the drum 10. The cards may be transferred on a continuous basis or the cards may sometimes be transferred on an intermittent basis in accordance with the signal information read from the cards by the transducing member 114.

It should be appreciated that the cards 44 on the drum 10 may actually become transferred to a member other than the drum 12. For example, the cards 44 may become transferred to an output stack similar to that described in co-pending application Serial No. 550,296. Such an output stack may be considered as a member for receiving the cards.

Another embodiment of the invention is shown in FIGURES 5 and 6. This embodiment includes a pair of drums 200 and 202 constructed in a manner similar to that shown in FIGURE 2 and described in detail for the drum 10. The drums 200 and 202 are disposed in contiguous relationship to each other in a manner similar to that shown in FIGURES 1 to 4, inclusive, and described in detail for the first embodiment of the invention. The drums 200 and 202 are provided with slots 204 corresponding to the slots 36 in the drums 10 and 12 in the previous embodiment. Cards 206 corresponding to the cards 44 are adapted to be fixedly positioned on the peripheries of the drums 200 and 202. Actually, the drum 202 may be considered as representative of various types of receiving members such as an output stack.

Actuating apparatus is disposed to exert a substantially tangential force on the periphery of the drum 10. The tangential force is exerted by the flow of air through members similar to those shown in FIGURES 1 to 4, inclusive, and described fully above. The members include a feed line 208 (FIGURE 6) corresponding to the feed line 92 in the embodiment shown in FIGURES 1 to 4, inclusive, and also include a housing generally indicated at 210 and corresponding in construction to the housings 100.

The housing 210 is provided with a tear-drop configuration and is disposed so that the thin end of the housing is closer to the drums 200 and 202 than the thick end of the housing. The housing 210 has a configuration symmetrical about a middle line. The housing 210 is disposed relative to the drums 200 and 202 so that the line of symmetry when extended is tangential to the drum 200. This position of tangency corresponds substantially to the position of contiguity between the drums 200 and 202.

The housing 210 has a passageway 212 (FIGURE 6) in communication with the supply line 208 and also has a mouth portion 214 in communication with the passageway 212. The passageway 212 and the mouth portion 214 in the housing 210 correspond in construction to the passageways 106 and the mouth portions 108 in the housings 100 shown in FIGURES 1 to 4, inclusive, and described fully above. Holes 216 are provided in the housing 210 at vertical levels corresponding to the slots 204 in the drums 200 and 202.

Air under pressure passes through a circuit including the feed line 208 and the housing 210. The air flows through the passageway 212 and the mouth portion 214 of the housing 210 and emerges as streams of air from the holes 216 in the thin end of the housing. The streams of air have a relatively high velocity because of the small diameter of the holes 216. This causes the streams of air to impinge on the periphery of the drum 200 with a relatively great force. The force exerted by the streams of air remains substantially constant in any position of the drum 200 since no such members as studs and spacers can interrupt the stream of air in any positioning of the drum.

The streams of air in effect exert a shearing force between the periphery of the drum 200 and the cards 206 on the drum such that the cards become removed from the drum. After becoming attracted to the drum 202, the cards 206 remain fixedly positioned on the drum during the drum rotation because of the vacuum pressure exerted on the periphery of the drum. The cards 206 on the drum 202 may be subsequently transferred back to the drum 200, to a third drum (not shown) or to an output stack (not shown).

There is thus provided apparatus for use in a data processing system to obtain a transfer of information cards from a first drum to a second drum. The apparatus obtains a transfer of information cards between a pair of rotatable drums without any need for moving parts. The apparatus obtains such a transfer of cards by the use of pneumatic forces. In one embodiment of the apparatus constituting this invention, the pneumatic force is exerted against the cards in a radial direction with respect to the periphery of the drums. In another embodiment, the pneumatic force is exerted in a direction substantially tangential to the drum from which the card is being transferred.

Although this invention has been disclosed and illustrated with reference to particular applications, the principles involved are susceptible of numerous other applications which will be apparent to persons skilled in the art. The invention is, therefore, to be limited only as indicated by the scope of the appended claims. For example, the term of "cards" as used in the specification and in the claims is intended to cover any type of discrete element which is capable of recording information for subsequent reproduction.

What is claimed is:

1. In combination for use with a plurality of cards each having a plurality of signal information media thereon, a rotatable drum provided with a plurality of openings at its periphery; means including a rotatable drum for exerting a force on the cards to hold the cards in fixed position on the drum during the drum rotation; a member for receiving the cards from the first drum; means having a stationary disposition displaced from the drum for subjecting the cards to a fluid stream under pressure with a force exceeding that exerted on the cards by the card holding means and in a direction counteracting the force exerted on the cards by the card holding means; the fluid-pressure means and the holding means including the drum being constructed to maintain the holding force exerted by the holding means on the cards during the action of the fluid-pressure means in removing the cards from the drum; and means operatively coupled to the fluid-pressure means for obtaining only intermittent operations of the fluid-pressure means in accordance with the signal information on the cards to obtain a transfer of only particular cards in the plurality from the rotatable drum to the receiving member.

2. In combination for use with a plurality of cards each having a plurality of signal information media thereon, a rotatable drum, there being slots extending around the periphery of the drum and at least one passageway for the withdrawal of air through the slots to produce a vacuum force on the periphery of the drum for the fixed positioning of the cards on the drum, means for withdrawing air through the passageway and slots in the drum for the imposition of the vacuum force on the periphery of the drum, means for receiving cards from the drum, means for producing a flow of fluid under pressure, means including a stationary housing displaced from the drum and constructed to receive the flow of fluid under pressure and disposed relative to the drum and constructed to direct the fluid against the cards on the drum in at least one stream with an intensity producing on the cards a force greater than the vacuum force exerted by the drum on the cards to obtain a transfer of cards from the drum to the receiving means, the stationary housing being disposed relative to the drum to obtain the transfer of cards from the drum to the receiving means without interrupting the vacuum force exerted by the drum on the cards to retain the cards on the periphery of the drum, and means operatively coupled to the stationary housing for controlling the flow of fluid through the housing on an intermittent basis in accordance with the signal information on the cards to obtain a transfer of only particular cards in the plurality from the drum to the receiving means.

3. In combination for use with a plurality of cards each having a plurality of positions for holding signal information, means including a rotatable drum for creating a vacuum on the periphery of the drum to maintain the cards in fixed position on the drum during the drum rotation, means for receiving the cards from the drum, transducing means disposed relative to the cards on the periphery of the drum to sense the signal information provided on the cards moving with the drum past the transducing means, and means for applying fluid under pressure against the periphery of the drum at particular times in accordance with the signal information sensed by the transducing means and in accordance with the movement of the cards by the drum to a position under the influence of the fluid-pressure means to obtain the production of a force against the cards in a direction counteracting the vacuum force exerted on the cards by the drum and to obtain a transfer of the cards from the drum to the receiving means.

4. In combination for use with a plurality of cards each having a plurality of signal information media thereon, means including a first rotatable drum for holding the cards in fixed position on the drum during the drum rotation, means including a second rotatable drum for holding the cards in fixed position on the drum during the drum rotation, means having a stationary disposition and disposed in a particular relationship to the cards on the first drum for subjecting the cards on the first drum to a fluid stream under pressure with an effective intensity exceeding the holding action provided by the holding means on the cards on the first drum and in a direction having a component counteracting the holding force provided by the holding means on the cards on the first drum to obtain a transfer of cards from the first drum to the second drum for subsequent movement on the second drum, fluid-pressure means being constructed and being disposed relative to the first drum to subject the cards to the fluid pressure without interrupting the holding action provided on the cards by the holding means, and means operatively coupled to the fluid-pressure means for obtaining only an intermittent operation of the fluid-pressure means in accordance with the signal information on the cards for a transfer of only particular cards from the first drum to the second drum.

5. In combination for use with a plurality of cards each having a plurality of positions for holding signal information, means including a first rotatable drum for creating a vacuum on the periphery of the first drum to maintain the cards in fixed position on the first drum during the drum rotation, means including a second rotatable drum for creating a vacuum on the periphery of the second drum to maintain the cards in fixed position on the second drum during the drum rotation, transducing means disposed adjacent the periphery of the first drum to sense the signal information provided on the cards moving with the first drum past the transducing means, and means disposed in coupled relationship to the cards on the first drum for applying fluid under pressure against the cards on the periphery of the first drum in accordance with the signal information sensed by the transducing means and in accordance with the movement of the cards to a position for transfer from the first drum to the second drum to obtain a transfer of the cards from the first drum to the second drum without interrupting the production of the vacuum on the periphery of the first drum.

6. In combination for use with a plurality of cards each having a plurality of signal information media thereon, means including a first rotatable drum for exerting a force on the cards on the periphery of the first drum to maintain the cards in fixed position on the periphery of the first drum during the drum rotation, means including a second rotatable drum for exerting a force on the cards on the periphery of the second drum to maintain the cards in fixed position on the periphery of the second drum during the drum rotation, means disposed in spaced relationship to the first and second drums and in coupled relationship to the cards on the periphery of the first drum for applying fluid under pressure against the periphery of the first drum from a position external to the drum and in a direction having a major component substantially tangential to the periphery of the first drum and opposite to the direction of rotation of the first drum and at a time related to the movement of the cards with the first drum to a position of transfer from the first drum to the second drum to obtain a transfer of cards from the first drum to the second drum without interrupting the force exerted on the cards on the periphery of the first drum to maintain the cards in fixed position on the drum, and means operatively coupled to the fluid-pressure means for obtaining an intermittent operation of the fluid-pressure means in accordance with the signal information on the cards for a transfer of only particular cards from the first drum to the second drum.

7. In combination for use with a plurality of cards each having a plurality of positions for holding signal information, a first rotatable drum constructed to have a force applied to its periphery in a direction for maintaining the cards in fixed position on the drum during the drum rotation, means for creating a force on the periphery of the drum for maintaining the cards in fixed position on the periphery of the drum during the drum rotation, a second rotatable drum disposed in spaced relationship to the first drum and constructed to have a force applied to its periphery in a direction for maintaining the cards in fixed position on the drum during the drum rotation, means for creating a force on the periphery of the second drum for maintaining the cards in fixed position on the periphery of the drum during the drum rotation, and means disposed in spaced relationship to the first and second drums for introducing fluid under pressure against the periphery of the first drum from a position interior to the periphery of the drum and in a direction transverse to the drum periphery and having a component counteracting the force exerted on the cards by the first drum to obtain a transfer of the cards from the first drum to the second drum, the last mentioned means being operative to apply pressure against the periphery of the first drum without interrupting the retaining force exerted against the card being removed from the first drum to the second drum.

8. In combination for use with a plurality of cards each having a plurality of positions for holding signal information, means including a first rotatable drum for applying a vacuum force to the periphery of the first drum to maintain the cards in fixed position on the periphery of the first drum during the drum rotation, means including a second rotatable drum for applying a vacuum force to the periphery of the second drum to maintain the cards in fixed position on the periphery of the second drum during the drum rotation, means for providing a fluid under pressure, means including a valve and disposed relative to the cards on the first drum for introducing the fluid under pressure to the cards on the periphery of the first drum at particular times related to the movement of the cards with the first drum to a position for transfer to the second drum to obtain the production of a force having a component counteracting the force exerted by the first drum on the cards for a transfer of cards from the first drum to the second drum for subsequent movement with the second drum, and means including transducing means operative upon the valve at particular times in accordance with the signals produced in the transducing means by the signal information on the cards for preventing the introduction of the fluid under pressure to the periphery of the first drum at particular times and for providing for the introduction of fluid under pressure to the periphery of the first drum at other times to obtain a controlled transfer of the cards from the first drum to the second drum, the transducing means being disposed in coupled relationship to the cards on the first drum at a position before the position of transfer of the cards to the second drum in the direction of rotation of the first drum to control the operation of the valve in obtaining a transfer of cards from the first drum to the second drum.

9. In combination for use with a plurality of cards each having a plurality of signal information media thereon, a first rotatable drum, there being slots in the periphery of the drum and at least one passageway within the drum in communication with the slots for the withdrawal of air to produce a vacuum force on the periphery of the drum for the fixed positioning of the cards on the drum, a second rotatable drum disposed in contiguous relationship to the first drum, there being slots in the periphery of the second drum and at least one passageway within the second drum in communication with the slots for the withdrawal of air to produce a vacuum force on the periphery of the drum for the fixed positioning of the cards on the drum, means for withdrawing air through the drums for the imposition of the vacuum forces on the periphery of the drums, means for producing a flow of fluid under pressure, means including a housing having a fixed and stationary disposition and coupled to the fluid-pressure means and shaped to receive the flow of fluid under pressure and to direct the fluid against the cards on the first drum in at least one stream having a high velocity to obtain the production of a force counteracting the vacuum force exerted on the cards on the first drum so as to obtain a transfer of the cards from the first drum to the second drum, the last mentioned means being operative to obtain a transfer of cards from the first drum to the second drum without interrupting the vacuum force on the periphery of the first drum at the position of transfer of the cards from the first drum to the second drum, and means operatively coupled to the means including the housing to obtain only an intermittent direction of the fluid against the cards on the first drum in accordance with the signal information on the cards for a transfer only of particular cards from the first drum to the second drum.

10. In combination for use with a plurality of cards each having a plurality of positions for holding signal information, a first rotatable drum, there being at least one slot in the periphery of the first drum and there being a passageway disposed within the first drum and communicating with the slot in the periphery of the first drum and shaped to provide a uniform flow of air through the slot to the passageway, means forming a part of the drum to provide a seal against the leakage of air from the drum, a second rotatable drum disposed relative to the first drum to obtain a transfer of cards from the first drum to the second drum, there being at least one slot in the periphery of the second drum and there being a passageway disposed within the second drum and communicating with the slot in the second drum and shaped to provide a uniform flow of air through the slot to the passageway, means for withdrawing air through the slot in the passageway in each of the first and second drums to produce a vacuum force on the periphery of the drums for maintaining the cards in fixed position on the periphery of the drums, a housing supported by the sealing means at a position within the first drum, the housing being positioned and shaped to direct a stream of air against the cards on the first drum through the slot on the first drum and with a force counteracting the force exerted on the cards by the first drum and with an intensity sufficient to remove the cards from the first drum for transfer to the second drum, and means including the housing for obtaining a passage of air under pressure into the housing to obtain a transfer of cards from the first drum to the second drum.

11. In combination for use with a plurality of cards each having a plurality of signal information media thereon, a first rotatable drum, there being at least one slot in the periphery of the first drum and there being a passageway within the first drum and communicating with the slot for obtaining a removal of air from the periphery of the drum for obtaining a vacuum pressure on the periphery of the drum to provide for a fixed positioning of cards on the periphery of the drum during the drum rotation, a second rotatable drum disposed in a particular relationship to the first drum to obtain a transfer of cards from the first drum to the second drum, there being at least one slot in the periphery of the second drum and there being a passageway disposed with the second drum and communicating with the slot for obtaining a removal of air from the periphery of the second drum and for obtaining a vacuum pressure on the periphery of the second drum to provide for a fixed positioning of the cards on the periphery of the second drum during the drum rotation, means disposed relative to the passageways of the first and second drums for obtaining a removal of air through the slots from the peripheries of the drums, means for providing a flow of air under pressure, a housing disposed in coupled relationship to the pressure means and having a stationary disposition removed from the first drum for receiving the flow of air under pressure and disposed and shaped to direct a stream of air against the periphery of the first drum in a direction having a component substantially tangential to the periphery of the first drum at the position of transfer of the cards from the first drum to the second drum to obtain the production of a force for obtaining a transfer of the cards from the first drum to the second drum, and means operatively coupled to the housing for obtaining only an intermittent flow of air under pressure against the periphery of the first drum in accordance with the signal information on the cards for a transfer only of particular cards from the first drum to the second drum.

12. In combination for use with a plurality of cards each having a plurality of signal information media thereon, first transport means for the cards, second transport means for the cards, the second transport means being disposed relative to the first transport means to obtain a transfer of cards from the first transport means to the second transport means, means having a fixed and stationary disposition and disposed relative to the cards on the first transport means and relative to the first and second transport means for subjecting the cards on the first transport means to a fluid stream under pressure to obtain a transfer of the cards from the first transport means to the second transport means, and means operatively coupled to the fluid-pressure means for obtaining an intermittent operation of the fluid-pressure means in accordance with the signal information on the cards for the transfer of only particular cards from the first transport means to the second transport means.

13. The combination set forth in claim 12 in which the fluid-pressure means is disposed relative to the cards on the first transport means to exert against the cards a force having a major component tangential to the cards on the first transport means to produce a shearing force against such cards.

14. In combination for use with a plurality of cards each having a plurality of signal information media thereon, first transport means for the cards, second transport means for the cards, the second transport means being disposed in contiguous relationship to the first transport means to obtain a transfer of cards from the first transport means to the second transport means, means having a fixed and stationary disposition removed from the first and second transport means and disposed relative to the cards on the first transport means for directing a pneumatic force against the cards on the first transport means at the position of transfer of the cards to the second transport means to obtain a transfer of such cards from the first transport means to the second transport means, and means operatively coupled to the pneumatic means for obtaining only an intermittent operation of the pneumatic means in accordance with the signal information on the cards for the transfer only of particular cards from the first transport means to the second transport means.

15. The combination set forth in claim 14 in which the pneumatic means is disposed between the first and second transport means at a position exterior to the first and second transport means and in which the pneumatic means is disposed to direct a pneumatic force against the cards in a direction having a major component parallel to the cards on the first transport means and along a line between the first transport means and the cards on the first transport means to obtain a shearing force for lifting the cards from the first transport means to the second transport means.

16. In a combination as set forth in claim 3, the fluid-pressure means including a housing with an opening having a configuration tapering toward one end and having at least one slot extending through the housing from the opening in the housing, the housing being disposed to receive fluid and being disposed with its tapered end facing the cards on the drum to direct a stream of fluid at high velocities through the slot and against the cards for a transfer of the cards from the drum to the receiving means.

17. In combination for use with a plurality of cards each having a plurality of positions for holding signal information, means including a transport member movable in a closed loop for holding the cards in fixed position on the periphery of the transport member during the movement of the member, a member for receiving the cards from the transport member, transducing means disposed in coupled relationship to the transport member to sense the signal information on the cards moving with the transport member past the transducing means, and means for subjecting the cards to a fluid stream under pressure at particular times during the movement of the cards with the transport member and in accordance with the signal information sensed by the transducing means and in a particular direction to obtain a transfer of cards from the transport member to the receiving member, the fluid-pressure means being constructed and being disposed relative to the transport member to obtain the transfer of cards from the transport member to the receiving member without interrupting the retaining force exerted on the cards by the holding means.

18. A combination as set forth in claim 17 in which the transport member is a rotatable drum and in which a valve is included in the fluid pressure means and is operative at particular times in accordance with the signal information sensed by the transducing means to control the application of the fluid pressure to the cards moving with the transport member.

19. A combination as set forth in claim 17 in which the transport member and the receiving member are rotatable drums constructed to hold the cards in fixed position on the drums during the drum rotations and in which a housing is included in the fluid-pressure means and in which the housing is provided with a tapered configuration and is slotted at its tapered end and is disposed relative to the transport member and is constructed to direct the fluid in a stream through the slotted end against the cards for a transfer of cards from the transport member to the receiving member.

20. A combination as set forth in claim 17 in which the transport and receiving members are rotatable drums having slotted peripheries and having passageways communicating with the slotted peripheries and in which means are coupled to the passageways in the drums for withdrawing air through the passageways and the slotted peripheries of the drums to hold the cards in fixed position on the peripheries of the drums during the drum rotations and in which a housing is included in the fluid-pressure means and in which the housing is provided with an opening of tapered configuration and in which at least one slot is provided in the housing at the tapered end of the housing and in which the housing is constructed to obtain the passage of fluid at high velocities through the slot and against the cards moving with the transport member for a transfer of the cards from the transport means and in which a valve is included in the fluid-pressure means to control the passage of fluid through the housing in accordance with the signal information sensed by the transducing means.

21. In combination for use with a plurality of cards each having a plurality of signal information media thereon, transport means for the cards and constructed to retain the cards during the movement of the cards, means disposed in coupled relationship to the transport means for retaining the cards on the transport means during the transport of the cards, receiving means disposed in spaced relationship to the transport means for receiving cards transferred from the transport means, fluid pressure means, the fluid pressure means being disposed in displaced relationship to the transport means and being disposed in a stationary relationship and being operative upon the transported cards for directing a fluid stream under pressure against the transported cards to exert a force against the cards in a particular direction and with an intensity for obtaining a transfer of the cards from the transport means to the receiving means and without any interruption in the retaining force exerted on the cards, and means operatively coupled to the fluid-pressure means for obtaining only an intermittent operation of the fluid-pressure means in accordance with the signal information on the cards on the transport means for a transfer of only particular cards from the transport means to the receiving means.

22. In combination for use with a plurality of cards each having a plurality of signal information media thereon, transport means for the cards and constructed to retain the cards during the movement of the cards, means disposed in coupled relationship to the transport means for applying a force against the transported cards to retain the cards on the transport means during the movement of the cards, receiving means disposed in spaced relationship to the transport means and constructed to receive cards transferred from the transport means, means disposed in a stationary relationship and operative upon the cards on the transport means for applying a pneumatic force against the transported cards without interrupting the retaining force on the transported cards to obtain a controlled transfer of the cards from the transport means to the receiving means, and means operatively coupled to the pneumatic means for obtaining the application of a pneumatic force against the cards only on an intermittent basis in accordance with the signal information on the cards to obtain a transfer of only particular cards from the transport means to the receiving means.

23. In combination for use with a plurality of cards each having a plurality of positions for holding signal information, transport means for the cards, means disposed in spaced relationship to the transport means for receiving the cards, transducing means disposed relative to the transport means at a position before the receiving means in the direction of the card transport to sense the signal information at particular positions on the transported cards, and fluid-pressure means having a stationary disposition and disposed in a displaced relationship to the transport means and operative upon the transported cards at a position past the transducing means in the direction of movement of the cards and responsive to the information sensed on the transported cards and operative in a particular direction relative to the movement of the cards to obtain a transfer of cards from the transport means to the receiving means.

24. In combination for use with a plurality of cards each having a plurality of positions for holding signal information, transport means for the cards, receiving means disposed in spaced relationship to the transport means for receiving cards transferred from the transport means, transducing means disposed relative to the transported cards at a position before the receiving means in the direction of movement of the cards for sensing particular information on the cards, a valve coupled to the transducing means and operative in first and second positions in accordance with information sensed on the cards, and pneumatic means including the valve, the pneumatic means having a stationary disposition removed from the transport means and disposed in coupled relationship to the transported cards and operative in one position of the valve in accordance with the information sensed on the cards to exert a pneumatic force against the cards in a direction and with an intensity for obtaining a transfer of cards from the transport means to the receiving means and operative in the second position of the valve in accordance with the information sensed on the cards to prevent a pneumatic transfer force from being exerted against the cards.

25. The combination as set forth in claim 24 in which the transport means are movable and are constructed to retain the cards for movement in accordance with the movement of the transport means.

26. The combination set forth in claim 21 in which the receiving means constitute second transport means and in which the first and second transport means are movable and in which the first transport means is constructed for the reception of the fluid stream by the cards on the first transport means in any position of the first transport means and in which the first and second transport means are constructed for the transfer of the cards from the first transport means to the second transport means in any positions of the first and second transport means.

27. The combination set forth in claim 22 in which the transport means are movable and are constructed to obtain a movement of the cards with the transport means and in which transducing means are operative upon the transported cards at a position before the receiving means in the direction of movement of the cards to sense information on the cards and in which the pneumatic means are responsive to the information sensed by the transducing means for controlled operation in accordance with the information sensed by the transducing means.

28. In combination for use with a plurality of cards each having a plurality of positions for holding signal information, first transport means for the cards, second transport means for the cards, the second transport means being disposed relative to the first transport means to obtain a transfer of cards from the first transport means to the second transport means, means having a fixed and stationary disposition and disposed relative to the cards on the first transport means and relative to the first and second transport means for subjecting the cards on the first transport means to a fluid stream under pressure to obtain a transfer of the cards from the first transport means to the second transport means, and the fluid pressure means being disposed relative to the cards on the first transport means to exert against the cards a force having a major component perpendicular to the cards on the first transport means to produce a force lifting the cards from the first transport means to the second transport means.

29. In combination for use with a plurality of cards each having a plurality of positions for holding signal information, first transport means for the cards, second transport means for the cards, the second transport means being disposed in contiguous relationship to the first transport means to obtain a transfer of cards from the first transport means to the second transport means, means having a fixed and stationary disposition removed from the first and second transport means and disposed relative to the cards on the first transport means for directing a pneumatic force against the cards on the first transport means at the position of transfer of the cards to the second transport means to obtain a transfer of such cards from the first transport means to the second transport means, the first transport means being provided with a hollow interior and with an opening in its periphery and the opening in the periphery of the first transport means communicating with a hollow interior and the pneumatic means being disposed within the hollow interior in the first transport means to direct a force through the opening in the first transport means in a direction having a major component perpendicular to the disposition of the cards on the first transport means.

References Cited in the file of this patent

UNITED STATES PATENTS

| | | |
|---|---|---|
| 144,822 | Ashley | Nov. 25, 1873 |
| 677,822 | Goebel | Feb. 12, 1901 |
| 1,595,478 | Minton | Aug. 10, 1926 |
| 1,838,200 | Tomtlund | Dec. 29, 1931 |
| 1,950,796 | Hilgerink | Mar. 13, 1934 |
| 1,968,941 | Hall | Aug. 7, 1934 |
| 2,427,712 | Casler | Sept. 23, 1947 |
| 2,686,052 | Winkler | Aug. 10, 1954 |
| 2,752,154 | Nelson | June 26, 1956 |
| 2,795,328 | Tyler | June 11, 1957 |
| 2,804,974 | Noon | Sept. 3, 1957 |
| 2,812,061 | Pfester | Nov. 5, 1957 |